United States Patent
Shimizu

(10) Patent No.: US 10,897,080 B2
(45) Date of Patent: Jan. 19, 2021

(54) WIRELESS COMMUNICATION DEVICE AND BEAM CONTROL METHOD

(71) Applicant: FUJITSU LIMITED, Kawasaki (JP)

(72) Inventor: Masahiko Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/996,586

(22) Filed: Jun. 4, 2018

(65) Prior Publication Data
US 2018/0358694 A1     Dec. 13, 2018

(30) Foreign Application Priority Data
Jun. 9, 2017 (JP) ................. 2017-114697

(51) Int. Cl.
*H01Q 3/00* (2006.01)
*H01Q 3/26* (2006.01)
(Continued)

(52) U.S. Cl.
CPC .......... *H01Q 3/2605* (2013.01); *G01S 3/74* (2013.01); *H01Q 1/523* (2013.01);
(Continued)

(58) Field of Classification Search
CPC .......... H01Q 3/2605; H01Q 3/26; H01Q 3/46; H01Q 21/293; H01Q 21/00; H01Q 1/253;
(Continued)

(56) References Cited

U.S. PATENT DOCUMENTS

| 5,473,601 A | 12/1995 | Rosen et al. |
| 6,075,484 A * | 6/2000 | Daniel ............ G01S 3/06 342/372 |

(Continued)

FOREIGN PATENT DOCUMENTS

| JP | 7-231287 | 8/1995 |
| JP | 2003-209534 | 7/2003 |

(Continued)

OTHER PUBLICATIONS

X. Huang et al., "A Hybrid Adaptive Antenna Array", IEEE Transactions on Wireless Communications, vol. 9, No. 5, May 2010, pp. 1770-1779 (10 pages).

*Primary Examiner* — Chuong P Nguyen
(74) *Attorney, Agent, or Firm* — Fujitsu Patent Center

(57) ABSTRACT

A wireless communication device includes: a plurality of subarrays each including a plurality of antenna elements and an analog circuit configured to perform a given analog process on signals to be transmitted from or received by the antenna elements; and a processor that is connected to the subarrays. The processor executes a process including: estimating direction of arrivals from which signals transmitted from a plurality of terminals come; calculating maps based on trigonometric functions of angles representing the estimated direction of arrivals; generating a plurality of groups to which the terminals belong based on the calculated maps; assigning, to each of the groups, a combination of subarrays to generate directional beams that do not interfere with each other; and determining weighting coefficients to generate directional beams in directions of the terminals which belongs to each group by using the combination of subarrays assigned.

7 Claims, 10 Drawing Sheets

(51) Int. Cl.
*H01Q 1/52* (2006.01)
*H01Q 21/29* (2006.01)
*G01S 3/74* (2006.01)
G01S 3/04 (2006.01)
G01S 5/06 (2006.01)
H04B 7/06 (2006.01)

(52) U.S. Cl.
CPC ............ *H01Q 21/293* (2013.01); *G01S 3/043* (2013.01); *G01S 5/06* (2013.01); *H01Q 3/26* (2013.01); *H04B 7/0617* (2013.01)

(58) Field of Classification Search
CPC ... G01S 3/74; G01S 3/043; G01S 3/00; G01S 5/06; H04B 7/0617
USPC ................................. 342/372, 368, 417, 423
See application file for complete search history.

(56) References Cited

U.S. PATENT DOCUMENTS

| | | | | |
|---|---|---|---|---|
| 6,128,486 A * | 10/2000 | Keskitalo | ................. | H04B 7/10 455/422.1 |
| 6,657,590 B2 * | 12/2003 | Yoshida | ............... | H04B 7/0851 342/383 |
| 6,738,018 B2 * | 5/2004 | Phelan | ..................... | G01S 3/74 342/157 |
| 6,850,190 B2 * | 2/2005 | Ryu | ....................... | H01Q 1/246 329/317 |
| 6,987,482 B2 * | 1/2006 | Sondur | ................. | H04B 7/086 342/377 |
| 7,069,050 B2 * | 6/2006 | Yoshida | ................. | H01Q 1/246 370/334 |
| 7,414,580 B2 * | 8/2008 | Adler | ....................... | G01S 3/74 342/372 |
| 7,570,957 B2 * | 8/2009 | Atarashi | .............. | H04B 7/086 342/147 |
| 7,940,215 B2 * | 5/2011 | Kishigami | ............ | H04B 7/086 342/368 |
| 8,891,390 B2 * | 11/2014 | Kanzaki | .............. | H04B 7/0426 370/252 |
| 9,258,049 B2 * | 2/2016 | Fujii | .................... | H04B 7/0848 |
| 10,230,446 B2 * | 3/2019 | Sun | ...................... | H04B 7/0669 |
| 2003/0162551 A1 | 8/2003 | Atarashi et al. | | |
| 2016/0308280 A1 * | 10/2016 | Shimizu | ................... | G01S 5/06 |
| 2017/0093038 A1 * | 3/2017 | Li | ............................ | H01Q 3/36 |
| 2017/0237162 A1 * | 8/2017 | Shimizu | .............. | H01Q 1/2291 342/377 |

FOREIGN PATENT DOCUMENTS

| | | |
|---|---|---|
| JP | 2003-244054 | 8/2003 |
| JP | 2012-175177 | 9/2012 |
| JP | 2016-201769 | 12/2016 |

\* cited by examiner

|  | FIRST BEAM 201 | SECOND BEAM 202 | THIRD BEAM 203 | FOURTH BEAM 204 |
|---|---|---|---|---|
| SUBARRAY #1 | 0 | 0 | 0 | 0 |
| SUBARRAY #2 | 0 | $\pi/2$ | $\pi$ | $3\pi/2$ |
| SUBARRAY #3 | 0 | $\pi$ | $2\pi$ | $3\pi$ |
| SUBARRAY #4 | 0 | $3\pi/2$ | $3\pi$ | $9\pi/2$ |

FIG.8

|  | NUMBER OF TERMINALS OF FIRST GROUP | NUMBER OF TERMINALS OF SECOND GROUP | NUMBER OF OTHER TERMINALS | NUMBER OF TERMINALS WITH WHICH COMMUNICATIONS ARE PERFORMED SIMULTANEOUSLY |
|---|---|---|---|---|
| PATTERN 1 | 4 | 0 | 0 | 4 |
| PATTERN 2 | 3 | 0 | 1 | 3 |
| PATTERN 3 | 2 | 0 | 2 | 3⇒4 |
| PATTERN 4 | 2 | 2 | 0 | 2⇒3 OR 4 |
| PATTERN 5 | 0 | 0 | 4 | 4 |

FIG.10

| | NUMBER OF TERMINALS OF FIRST GROUP | NUMBER OF TERMINALS OF SECOND GROUP | NUMBER OF OTHER TERMINALS | NUMBER OF TERMINALS WITH WHICH COMMUNICATIONS ARE PERFORMED SIMULTANEOUSLY |
|---|---|---|---|---|
| PATTERN 1 | 4 | 0 | 0 | 4 |
| PATTERN 2 | 3 | 0 | 1 | 3 |
| PATTERN 3 | 2 | 0 | 2 | 3 |
| PATTERN 4 | 2 | 2 | 0 | 2 |
| PATTERN 5 | 0 | 0 | 4 | 4 |

WIRELESS COMMUNICATION DEVICE AND BEAM CONTROL METHOD

CROSS-REFERENCE TO RELATED APPLICATION

This application is based upon and claims the benefit of priority of the prior Japanese Patent Application No. 2017-114697, filed on Jun. 9, 2017, the entire contents of which are incorporated herein by reference.

FIELD

The embodiments discussed herein are related to a wireless communication device and a beam control method.

BACKGROUND

In general, for directional beam control using an array antenna including an array of multiple antenna elements, an analog method using a phased array and a digital method to weight each of the multiple antenna elements by digital signal processing are known. In the analog method, it suffices if a radio circuit and a digital-analog/analog-digital (DA/AD) converter of a single system are provided for the multiple antenna elements and therefore the power consumption is relatively small. In the analog method, however, directional beams (simply referred to as "beams" below) are generated in a single direction and thus it is difficult to direct beams to multiple terminals simultaneously. On the other hand, in the digital method, while it is easy to direct beams to multiple terminals simultaneously, radio circuits and DA/AD converters equal in number to antenna elements are provided and this increases power consumption.

To deal with this, a hybrid method to perform beam control using the analog system and the digital system in combination has been proposed in recent years. The hybrid method makes it possible to direct beams to multiple terminals simultaneously while reducing power consumption more than the digital method does. In other words, in the hybrid method, radio circuits and DA/AD converters of multiple systems are provided and the radio circuit and the DA/AD converter of each of the systems are connected to multiple antenna devices. Accordingly, the number of systems of radio circuits and DA/AD converters is smaller than the number of antenna elements and thus the power consumption can be reduced compared to the digital method. Furthermore, it is possible to process data streams equal in number to the systems of radio circuits and DA/AD converters simultaneously and accordingly it is possible to direct beams simultaneously to terminals equal in number to the systems of radio circuits and DA/AD converters.

In the following descriptions, a radio circuit and a DA/AD converter of one system and multiple antenna elements connected to the system are collectively referred to as a "subarray". Accordingly, hybrid beam control enables communications in which beams are simultaneously directed to terminals equal in number to the subarrays.

In hybrid beam control using multiple subarrays, grouping terminals in directions for which a common phase can be used for weighting and directing beams simultaneously to the terminals in the same group are being examined. The grouping and directing cause beams directing to the respective terminals to intensify mutually and thus enables generation of beams with enough power intensity to multiple terminals with which communications are performed simultaneously.

Patent Document 1: Japanese Laid-open Patent Publication No. 2016-201769

Non-patent Document 1: X. Huang, Y. Jay Guo and J. D. Bunton, "A Hybrid Adaptive Antenna Array", IEEE TRANSACTIONS ON WIRELESS COMMUNICATIONS, Vol. 9, No. 5, May 2010.

When terminals are grouped, for example, as described above, the terminals are grouped according to a condition that a common phase can be used for weighting and therefore all the terminals are not necessarily grouped. In other words, in the above-described grouping, a map is calculated based on trigonometric functions of a direction from which a signal comes from each terminal and terminals for which the interval between the maps satisfies a given condition belong to the same group. For this reason, depending on the position of a terminal, there is not any other terminal which belongs to the same group. In that case, the number of terminals with which communications are performed simultaneously is 1 and all the subarrays are used to generate beams to the single terminal, which is inefficient.

To deal with this, switching generation of beams to multiple terminals of each group using all the subarrays according to the positions of the multiple terminals or generation of a beam to each terminal using each of the subarrays according to the positions of the multiple terminals can be assumed. In other words, when multiple terminals are in positions in which the terminals belong to the same group, all the subarrays are used to generate beams to the group with sufficient power intensity. On the other hand, when terminals are in positions in which the terminals belong to different groups, respectively, subarrays different from one another are used for the respective terminals to generate beams to the terminals equal in number to the subarrays that are used.

Specifically, for example, when the number of subarrays is 4, the number of terminals with which communications can be performed simultaneously varies depending on the pattern of the positions of the respective terminals, for example, as represented in FIG. 10. In this example, the number of subarrays is 4 and thus the maximum number of terminals with which communications can be performed simultaneously is also 4.

In Pattern 1, as the four terminals all belong to First Group, all the subarrays are used to simultaneously generate beams to the four terminals of First Group. Accordingly, it is possible to communicate with the four terminals simultaneously.

In Pattern 2, as three terminals belong to First Group and the remaining one terminal does not belong to First Group and, all the subarrays are used to simultaneously generate beams to the three terminals which belong to First Group. Accordingly, it is possible to communicate with the three terminals simultaneously.

In Pattern 3, as two terminals belong to First Group, and the remaining two terminals do not belong to the same group, different subarrays are used for the respective terminals to simultaneously generate beams to one terminal which belong to First Group and the two terminals which do not belong to any group. In other words, subarrays different from one another are used to simultaneously generate beams to the three terminals in positions corresponding to the different groups, respectively. Accordingly, it is possible to communicate with the three terminals simultaneously.

In Pattern 4, as two terminals belong to First Group, and the remaining two terminals belong to the same group, Second Group, all the subarrays are used to simultaneously generate beams to the two terminals which belong to any one of the groups. Accordingly, it is possible to communicate with the two terminals simultaneously.

In Pattern 5, because all the four terminals do not belong to the same group, different subarrays are used for the respective terminals to simultaneously generate beams to the respective terminals. Accordingly, it is possible to communicate with the four terminals simultaneously.

Switching between beam control to use all the subarrays to generate beams to terminals of one group and beam control to use subarrays different for the respective terminals to generate beams to the respective terminals however has a limitation on the number of terminals with which communications can be performed simultaneously. In other words, for example, in the example represented in FIG. 10, although the maximum number of terminals with which communications can be performed simultaneously with the four subarrays is 4, the number of terminals with which communications are performed simultaneously is 2 or 3 in Patterns 2 to 4.

As described above, it is difficult to sufficiently increase the number of terminals with which communications can be performed simultaneously depending on the positional relationship among the terminals and thus there is a problem there is a given limitation on increasing the throughput over the system.

SUMMARY

According to an aspect of an embodiment, a wireless communication device includes a plurality of subarrays each including a plurality of antenna elements and an analog circuit configured to perform a given analog process on signals to be transmitted from the antenna elements or signals that are received by the antenna elements, and a processor that is connected to the subarrays. The processor is configured to execute a process including: estimating direction of arrivals from which signals transmitted from a plurality of terminals come; calculating maps based on trigonometric functions of angles representing the estimated direction of arrivals; generating a plurality of groups to which the terminals belong based on the calculated maps; assigning, to each of the groups, a combination of subarrays to generate directional beams that do not interfere with each other, the combination of subarrays being included in the subarrays; and determining weighting coefficients to generate directional beams in directions of the terminals which belongs to each group by using the combination of subarrays assigned to each of the groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a table to explain increases in the number of terminals with which communications are performed simultaneously;

FIG. 10 is a table representing a specific example of the number of terminals with which communications are performed simultaneously in each pattern of positions of terminals.

DESCRIPTION OF EMBODIMENTS

Preferred embodiments of the present invention will be explained with reference to accompanying drawings. Note that the embodiments do not limit the invention.

Figure 1:
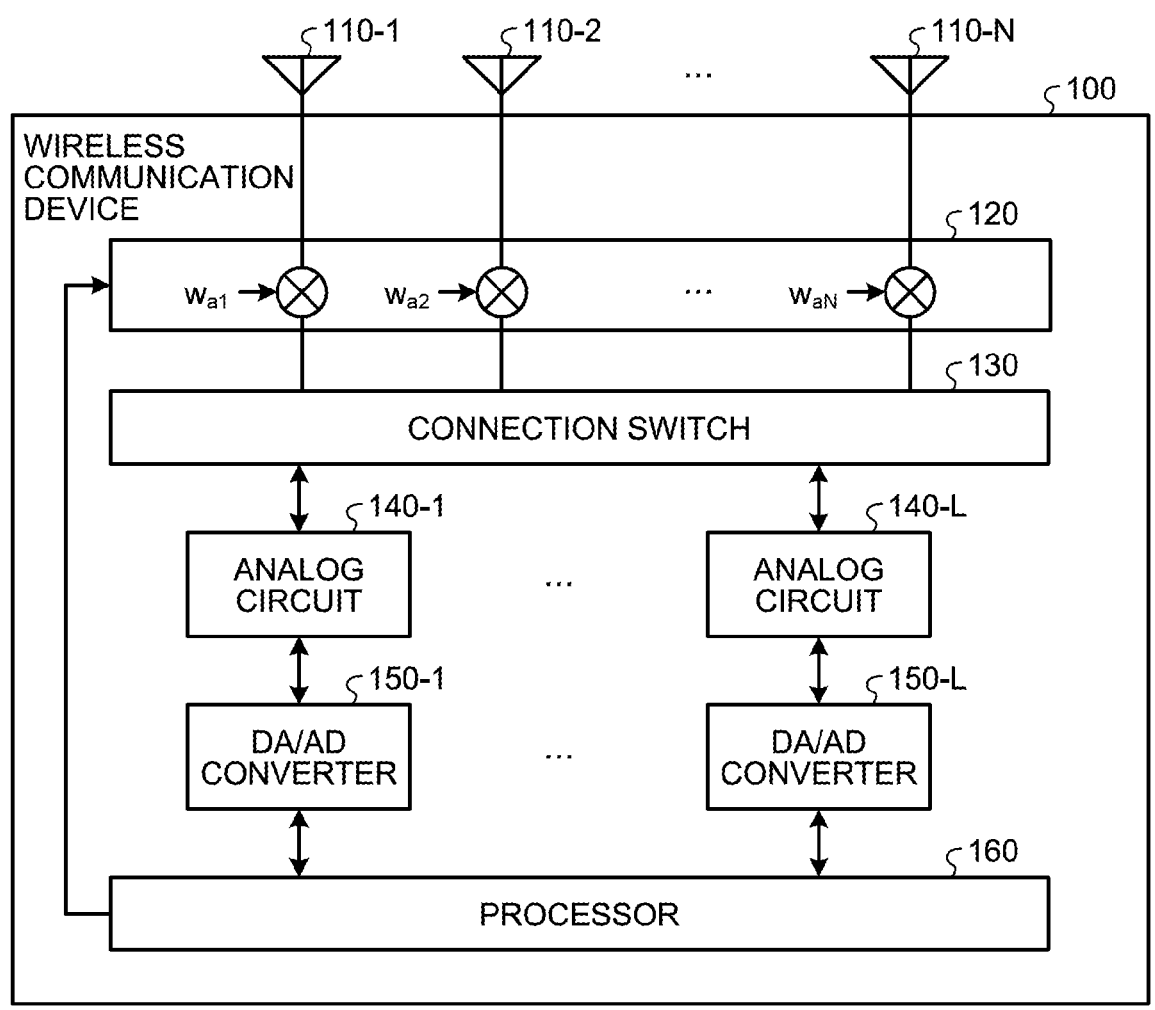
FIG. 1 is a block diagram illustrating a configuration of a wireless communication device according to an embodiment.

FIG. 1 is a block diagram illustrating a configuration of a wireless communication device 100 according to an embodiment. The wireless communication device 100 includes antenna elements 110-1 to 110-N (N is an integer equal to or larger than N), a phase shifter 120, a connection switch 130, analog circuits 140-1 to 140-L (L is an integer equal to or larger than 2 and smaller than N), DA/AD converters 150-1 to 150-L and a processor 160.

The antenna elements 110-1 to 110-N are arrayed linearly on a straight line to form an antenna array. An interval d between the antenna elements is set at, for example, a half of a wavelength λ of a radio wave that is transmitted and received.

The phase shifter 120 weights the antenna elements 110-1 to 110-N by weighting coefficients $w_{a1}$ to $w_{aN}$ and generates beams. The phase shifter 120 generates the beams by using the weighting coefficients $w_{a1}$ to $w_{aN}$ of which the phase shifter 120 is notified by the processor 160. When a beam directed in a direction having an angle θ formed by the beam and a direction orthogonal to the direction in which the antenna elements 110-1 to 110-N are arrayed is generated, a weighting coefficient $w_{an}$ (n is one of integers 1 to N) is, for example, represented by Equation (1) given below.

$$w_{an} = e^{j2\pi(n-1)\frac{d}{\lambda}\sin\theta} \tag{1}$$

In Equation (1) given above, e denotes a base of a natural logarithm, j denotes an imaginary unit, d denotes an interval between antenna elements, and λ denotes a wavelength of a radio wave. Weighting the antenna elements 110-1 to 110-N by the weight coefficients $w_{a1}$ to $w_{aN}$ aligns the phases of radio waves that are emitted in the direction corresponding to θ from the respective antenna elements or that are incident on the respective antenna elements from the direction corresponding to θ so that beams are generated in the direction corresponding to θ.

Figure 2:
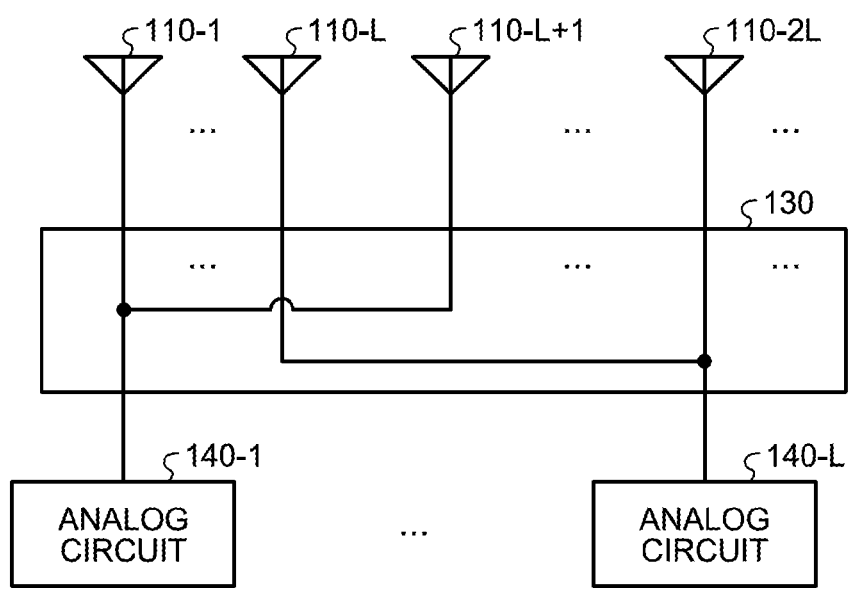
FIG. 2 is a diagram illustrating connection with connection switches.

The connection switch 130 connects the antenna elements 110-1 to 110-N and the analog circuits 140-1 to 140-L. Specifically, as illustrated in FIG. 2, the connection switch 130, for example, connects the analog circuit 140-1 and antenna elements at L intervals from the antenna element 110-1 and connects the analog circuit 140-L and antenna elements at L intervals from the antenna element 110-L. In other words, if generalized, the connection switch 130 connects an analog circuit 140-$i$ ($i$ is any one of integers 1 to L) with an antenna element 110-($i+a$L) ($a$ is an integer equal to or larger than 0).

FIG. 1 will be referred back here. The analog circuits 140-1 to 140-L perform a given analog process on signals to be transmitted and signals that are received. Specifically, the analog circuits 140-1 to 140-L perform up-conversion on a signal to be transmitted to amplify the signal and perform down-conversion on received signal that is received.

The DA/AD converters 150-1 to 150-L execute DA conversion or AD conversion on signals to be transmitted and received signals. In other words, the DA/AD converters 150-1 to 150-L perform DA conversion on signals to be transmitted that are output from the processor 160 and output the resultant analog signals to the analog circuits 140-1 to 140-L. Furthermore, the DA/AD converters 150-1 to 150-L performs AD conversion on received signals that are output from the analog circuits 140-1 to 140-L and output the resultant digital signals to the processor 160.

As described above, the antenna elements 110-1 to 110-N are connected to the analog circuits 140-1 to 140-L and the DA/AD converters 150-1 to 150-L and thus the wireless communication device 100 includes L subarrays. Accordingly, the maximum number of terminals with which the wireless communication device 100 is able to communicate is L. Each of the subarrays includes the antenna elements 110-1 to 110-N at L intervals.

The processor 160, for example, includes a central processing unit (CPU), a field programmable gate array (GPGA) or a digital signal processor (DSP) and estimates direction of arrivals (DOAs) in which received signals come from terminals to estimate positions of the respective terminals and then calculates weighting coefficients for directing beams to the terminals, respectively. The processor 160 calculates maps based on trigonometric functions of angles representing the positions of the terminals and groups the terminals based on the calculated maps. The processor 160 assigns a subarray for the terminals of each group such that the number of terminals with which communications can be performed simultaneously is maximized and each of the subarrays generates a beam.

Figure 3:
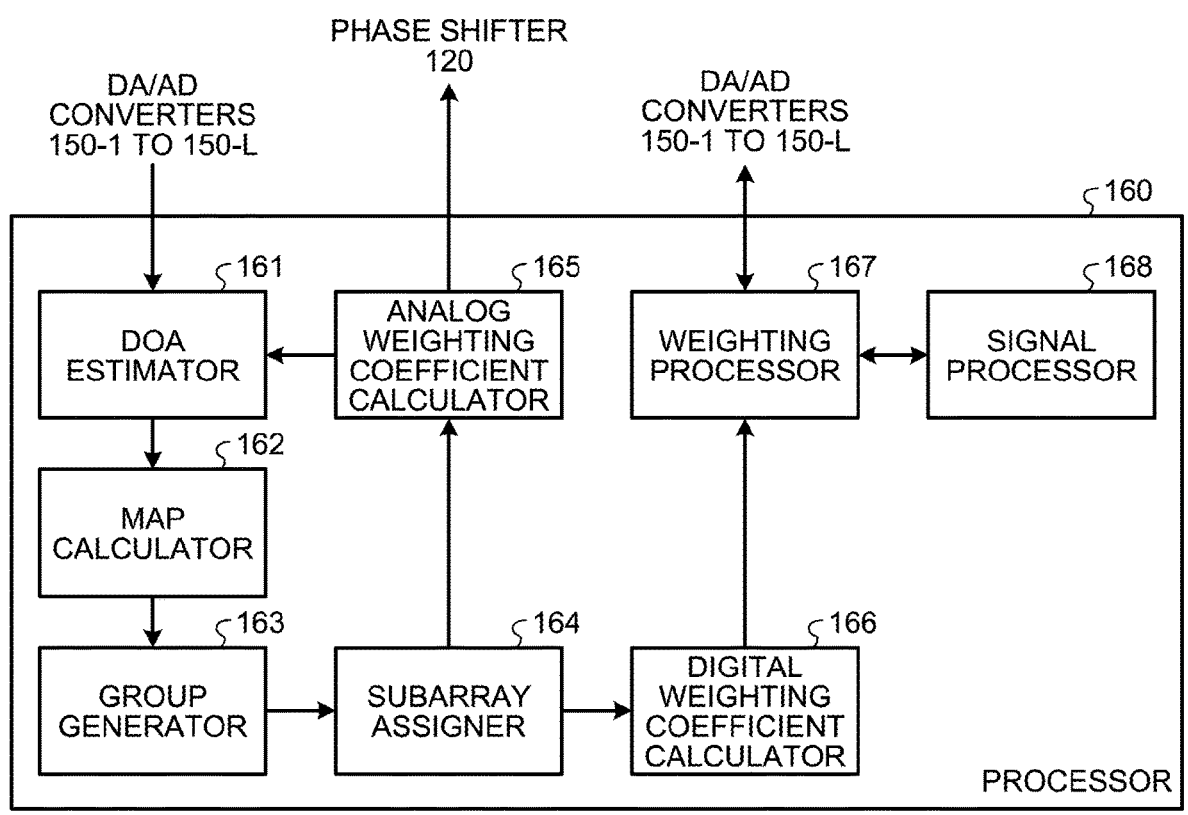
FIG. 3 is a block diagram illustrating functions of a processor.

Specifically, as illustrated in FIG. 3, the processor 160 includes a DOA estimator 161, a map calculator 162, a group generator 163, a subarray assigner 164, an analog weighting coefficient calculator 165, a digital weighting coefficient calculator 166, a weighting processor 167 and a signal processor 168.

The DOA estimator 161 acquires signals received from multiple terminals that are output from the DA/AD converters 150-1 to 150-L and estimates direction of arrivals from which the received signals come. The DOA estimator 161 estimates the direction of arrivals in which the received signals come, respectively, in consideration of the weighting coefficients $w_{a1}$ to $w_{aN}$ that are calculated by the analog weighting coefficient calculator 165. In other words, the DOA estimator 161 acquire the weighting coefficients $w_{a1}$ to $w_{aN}$ that are set for the antenna elements 110-1 to 110N from the analog weighting coefficient calculator 165 and uses the weighting coefficients $w_{a1}$ to $w_{aN}$ to estimates direction of arrivals from which the received signals come.

The DOA estimator 161 calculates, as an angle representing a direction from which a received signal comes, an angle that is formed by a direction orthogonal to the direction in which the antenna elements 110-1 to 110-N are arrayed and the DOA from which the reception signal comes. In other words, the DOA estimator 161 sets the direction orthogonal to the direction in which the antenna elements 110-1 to 110-N are arrayed at 0 degrees and calculates an angle to the direction as the DOA from which the received signal comes.

The map calculator 162 calculates maps based on trigonometric functions of the DOAs from which the received signals come and that are estimated by the DOA estimator 161. Specifically, the map calculator 162 calculates a sine (sin) of each of the angles representing the respective directions. Accordingly, the map calculator 162 calculates sines of the angles representing the positions of the respective terminals as maps about the respective terminals. An angle to the direction corresponding to 0 degrees and in which the antenna elements 110-1 to 110-N are arrayed may be calculated as a DOA from which a received signal comes. In this case, the map calculator 162 may calculate a cosine (cos) of an angle representing the position of each terminal.

The group generator 163 groups multiple terminals based on the maps that are calculated by the map calculator 162. Specifically, the group generator 163 sets a terminal as a reference terminal and causes terminals corresponding to maps for which the difference between the map and the map about the reference terminal satisfies a given condition to belong to the same group to which the reference terminal belongs. The group generator 163 sequentially sets reference terminals and, until all the terminals belong to any group, repeats determination on whether maps about the reference terminal and each terminal satisfy the given condition.

Figure 4:
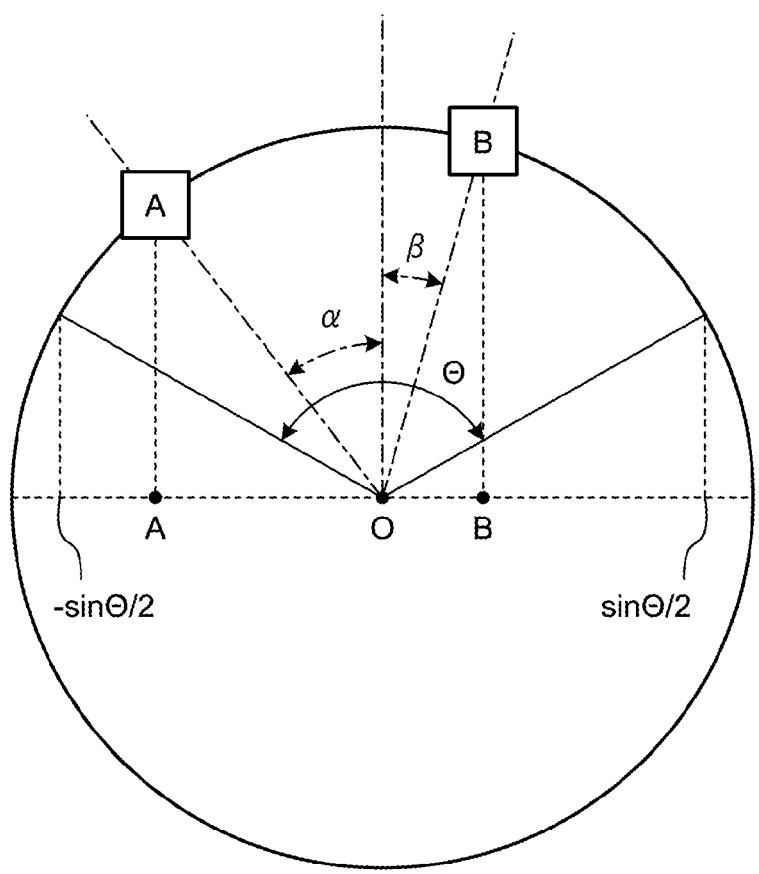
FIG. 4 is a diagram illustrating grouping.

The condition that a map of a terminal which belong to the same group to which the reference terminal belongs is to satisfy will be described with reference to FIG. 4. FIG. 4 is a diagram schematically representing a point O at which the wireless communication device 100 is positioned and the positions of Terminal A and terminal B. Assume that, in FIG. 4, the antenna elements 110-1 to 110-N of the wireless communication device 100 that is positioned at Point O are linearly arrayed horizontally. Assume that an area where which the antenna elements 110-1 to 110-N are able to generate beams corresponds to the angle Θ in FIG. 4. Thus, maps based on the sines of the directions of the beams that are generated in the area are covered by the range from −sin Θ/2 to sin Θ/2.

Assume that a DOA from which a received signal comes is estimated and accordingly α is calculated as an angle representing the positon of Terminal A. The map based on the sine about Terminal A is sin α. In other words, Point A in FIG. 4 is distant from Point O by sin α. When Terminal A serves as a reference terminal, the map about Terminal B which belongs to the same group to which Terminal A belongs satisfies Equation (2) given below.

$$\sin\beta = \sin\alpha + \frac{1}{L} \cdot 2\sin\frac{\Theta}{2} + \Delta x \qquad (2)$$

Note that, in Equation (2) given above, β denotes an angle representing the positon of Terminal B and Δ$x$ represents an error within an acceptable range. Furthermore, l is an integer whose absolute value is equal to or smaller than L. As Equation (2) represents, the interval between a map sin α about Terminal A which is the reference terminal and a map sin β about Terminal B is an interval obtained by adding the error Δ$x$ to an integral multiple of an interval obtained by equally dividing, by the number L of subarrays, the map of the area where beams can be generated by the antenna elements 110-1 to 110-N.

Such grouping causes no inter-beam interference in the directions of the respective terminals when beams are directed to the terminals in each group simultaneously and thus enables simultaneous communications with the terminals in the group.

The subarray assigner 164 determines assignment of the subarrays to the terminals of each of the groups based on the result of the grouping performed by the group generator 163. In other words, the subarray assigner 164 assigns the L subarrays to terminals of multiple groups to maximize the number of terminals with which communications can be performed simultaneously. In other words, the subarray assigner 164 assigns the L subarrays for multiple groups to enable simultaneous communications performed by not only terminals in one group but also the terminals of the multiple groups to which the subarrays are assigned.

The subarray assigner 164 determines, for each of the groups, whether terminals are present in directions in which beams orthogonal to each other can be generated by a combination of subarrays and assigns the subarrays sequentially from the group with the largest number number of directions in which terminals are present. Specifically, for one group, the subarray assigner 164 sets a division M of the number L of subarrays for the number of subarrays to be used and determines whether terminals are present respectively in M directions in which orthogonal beams are generated by using the usable M subarrays at K intervals between adjacent subarrays. The subarray assigner 164 then counts directions in each of which a terminal is present for each set of the inter-subarray interval K and the number M of subarrays to be used and stores the intervals K and the number M of subarrays to be used that maximizes the number of directions in which terminals are present in association with the group.

The directions in which orthogonal beams are generated with the M subarrays at K intervals satisfies Condition (A) given below.

$$\begin{cases} \frac{KM(k-1)}{L} \text{ is an integer, and} \\ \mod\left(\frac{KM(k-1)}{L}, M\right) \neq 0 \end{cases} \quad (A)$$

Note that, in (A) given above, k and L denote beam-direction numbers of beams that are generated with all the L subarrays and mod(m,n) represents a remainder obtained by dividing m by n.

For example, in a case where the number L of subarrays is 4 and two of the subarrays at two intervals a0re used to generate beams, when the remainder obtained by dividing the difference between k and l by 2 is not 0, it is possible to generate orthogonal beams not interfering with each other in directions of k and 1. Accordingly, beams in adjacent directions, from among the directions of the first to fourth beams that are generated by the four subarrays, for which the difference between the beam-direction numbers is an odd, such as the first and second directions or the second and third directions, do not interfere with each other. In the same manner, the first and fourth beams are orthogonal beams that do not interfere 0with each other.

On the other hand, in a case where two adjacent subarrays at one interval from among the four subarrays are used to generate beams, when a half of the difference between k and l is an integer and the remainder obtained by dividing a half of the difference between k and l by 2 is not 0, it is possible to generate orthogonal beams in the k and 1 directions. Accordingly, beams in directions with one direction in between for which the difference between the beam-direction numbers is 2, such as the first and third directions or the second and fourth directions, do not interfere with each other.

Condition (A) given above can be derived as follows. Specifically, it suffices if, in order to assign part of the subarrays to one group, M subarrays from among the L arrays are used to calculate a condition to generate orthogonal beams.

A beam a subarray i generates in a θ direction is represented by Equation (3) given below.

$$v_i(\theta) = \sum_{n=0}^{N-1} w_{i,n} e^{j2\pi \frac{d}{\lambda}(nL+i)\sin\theta} \quad (3)$$

In Equation (3), N denotes the number of antenna elements, L denotes the number of subarrays, d denotes a minimum interval between antenna elements, λ denotes a wavelength of carrier frequency, and $w_{i,n}$ denotes a weighting coefficient of the phase shifter 120. A beam in a $\theta_1$ direction satisfying the relation of Equation (2) given above with respect to a $\theta_0$ direction is represented by Equation (4) given below.

$$\begin{aligned} v_i(\theta_1) &= \sum_{n=0}^{N-1} w_{i,n} e^{j2\pi \frac{d}{\lambda}(nL+i)\sin\theta_1} \\ &= \sum_{n=0}^{N-1} w_{i,n} e^{j2\pi \frac{d}{\lambda}(nL+i)\left(\sin\theta_0 + \frac{\lambda 1}{dL}\right)} \\ &= \sum_{n=0}^{N-1} w_{i,n} e^{j2\pi \frac{d}{\lambda}(nL+i)\sin\theta_0} e^{j2\pi \frac{i1}{L}} \end{aligned} \quad (4)$$

To direct a strong beam to a $\theta_0$ direction, which is one of directions of grating lobe that is generated to direct a beam to a $\theta_1$ direction, the weighting coefficient $w_{i,n}$ for the phase shifter 120 to fix the amplitude and control the phase is as follows.

$$w_{i,n} = e^{-j2\pi \frac{d}{\lambda}(nL+i)\sin\theta_0}$$

Assigning this expression into Equation (4) leads to Equation (5) given below.

$$\begin{aligned} v_i(\theta_1) &= \sum_{n=0}^{N-1} e^{j2\pi \frac{i1}{L}} \\ &= N e^{j2\pi \frac{i1}{L}} \end{aligned} \quad (5)$$

Furthermore, when the phase shifter 120 changes the amplitude commonly among all the subarrays, Equation (6) given below is obtained from Equation (5).

$$v_i(\theta_1) = X e^{j2\pi \frac{i1}{L}} \quad (6)$$

$$\text{but } X = \sum_{n=0}^{N-1} w_{i,n} e^{j2\pi \frac{d}{\lambda}(nL+i)\sin\theta_0}$$

Beams that are generated in the $\theta_1$ direction with M subarrays at K intervals are as represented by Equation (7) given below from those represented by Equation (6) given above.

$$v(\theta_1) = \sum_{m=0}^{M-1} \alpha_{1,mK+m_0} v_{mK+m_0}(\theta_1) \qquad (7)$$

$$= \sum_{m=0}^{M-1} \alpha_{1,mK+m_0} e^{j2\pi \frac{mK+m_0}{L} 1} X$$

In Equation (7), $m_0$ denotes an index of an antenna element serving as a start point of the M subarrays. In order to direct a strong beam in the $\theta_1$ direction, it suffices if the following equation is satisfied.

$$\alpha_{1,mK+m_0} = e^{-j2\pi \frac{mK}{L} 1}$$

In this case, the beam according to Equation (7) given above can be represented by Equation (8) given below.

$$v(\theta_1) = e^{j2\pi \frac{m_0}{L} 1} XM \qquad (8)$$

The beam in a $\theta_k$ direction is represented by Equation (9) given below.

$$v(\theta_k) = \sum_{m=0}^{M-1} \alpha_{1,mK+m_0} v_{mK+m_0}(\theta_k) \qquad (9)$$

$$= e^{j2\pi \frac{m_0}{L} k} X \sum_{m=0}^{M-1} e^{j2\pi \frac{mK}{L}(k-1)}$$

$$= e^{j2\pi \frac{m_0}{L} k} X e^{j\pi \frac{K}{L}(M-1)(k-1)} \frac{\sin\left[\pi \frac{K}{L} M(k-1)\right]}{\sin\left[\pi \frac{K}{L}(k-1)\right]}$$

Not to apply interference to the $\theta_k$ direction even when a strong beam is generated in the $\theta_1$ direction, it suffices if $v(\theta_k)=0$ according to Equation (9). In other words, it suffices if, in Equation (9), the numerator of a fraction about sin is 0 and the denominator is not 0. This results in a condition that $\{KM(k-1)\}/L$ is an integer and $\{K(k-1)\}/L$ is not an integer. The condition is equivalent to Condition (A) given above.

For each combination of usable subarrays, the subarray assigner 164 specifies directions of orthogonal beams using Condition (A) given above, determines whether there are terminals in the directions of orthogonal beam, and stores the interval K and the number M of subarrays that maximize the number of directions of orthogonal beams in which terminals are present in association with the group. The subarray assigner 164 stores the interval K and the number M of subarrays for each group sequentially and assigns the stored M subarrays at K intervals to the group realizing the maximum number of orthogonal beams in directions in which terminals are present.

The subarray assigner 164 assigns usable subarrays not assigned to any group yet to groups to which no subarray is assigned yet in the above-described manner. Accordingly, the subarray assigner 164 sequentially assigns subarrays to terminals of each group such that the number of terminals with which communications can be performed simultaneously is maximized.

Beam control to combine multiple subarrays to generate beams will be referred to as "inter-subarray coding" below. Accordingly, the subarray assigner 164 assigns M subarrays to each group in order to perform inter-subarray coding. When there is a terminal only in a direction of one beam even when usable subarrays are combined, one subarray is assigned to the group of the terminal. In other words, when no beam is generated in directions of multiple terminals even when inter-subarray coding is performed, the subarray assigner 164 assigns one subarray to one terminal.

For terminals of each group to which subarrays are assigned by the subarray assigner 164, the analog weighting coefficient calculator 165 calculates weighting coefficients $w_{a1}$ to $w_{aN}$ to be used by the phase shifter 120. Specifically, for a group on which inter-subarray coding is performed, the analog weighting coefficient calculator 165 calculates weighting coefficients that are weighting coefficients of antenna elements belonging to the subarrays assigned to the group and that are weighting coefficients to generate beams directed in a direction of a reference terminal. In consideration of an error $\Delta x$ in grouping, the analog weighting coefficient calculator 165 may calculate weighting coefficients to generate beams directed in directions shifted from the direction of the reference terminal by an average of errors $\Delta x$ of the respective terminals in the group.

For a terminal on which inter-subarray coding is not performed, the analog weighting coefficient calculator 165 further calculates weighting coefficients that are weighting coefficients of antenna elements belonging to the subarray assigned to the terminal and are weighting coefficients to generate beams directed to the direction of the terminal. The analog weighting coefficient calculator 165 notifies the phase shifter 120 of the calculated weighting coefficients $w_{a1}$ to $w_{aN}$ and also notifies the DOA estimator 161 of the weighting coefficients $w_{a1}$ to $w_{aN}$.

For the terminals of each group to which the subarray assigner 164 assigns subarrays, the digital weighting coefficient calculator 166 calculates weighting coefficients to be used to weight digital signals of the respective terminals. Specifically, for a group on which inter-subarray coding is performed, the digital weighting coefficient calculator 166 calculates weighting coefficients corresponding to differences in direction between each terminal and the reference terminal. For a terminal on which inter-subarray coding is not performed, the digital weighting coefficient calculator 166 calculates weighting coefficients to generate beams directed in the direction of the terminal.

The weighting processor 167 uses the weighting coefficients calculated by the digital weighting coefficient calculator 166 to weight signals to the respective terminals of each group. In other words, the weighting processor 167 multiplies the weighting coefficients, which are calculated for the respective terminals, by signals that are input to the DA/AD converters 150-1 to 150-L or signals that are output from the DA/AD converters 150-1 to 150-L.

The signal processor 168 encodes and modulates data to each terminal to generate a signal to be transmitted or decodes and demodulates a signal that is received from each terminal. According to assignment of the subarrays performed by the subarray assigner 164, the signal processor 168 may implement scheduling such that the terminals of each group to which subarrays are assigned transmit signals to the wireless communication device 100 simultaneously and generate control signals to notify the respective terminals of the result of scheduling.

A beam generation process performed by the wireless communication device 100 configured as described above will be described with reference to the flowchart illustrated in FIG. 5.

When the wireless communication device 100 receives signals that are transmitted from multiple terminals with which the wireless communication device 100 communicates, the wireless communication device 100 estimates DOAs from which the received signals from all the terminals come (step S101). Specifically, signals that are received by the antenna elements 110-1 to 110-N undergo downconversion performed by the analog circuits 140-*a* to 140-L and undergo AD conversion performed by the DA/AD converters 150-1 to 150-L. The resultant digital received signals are then input to the DOA estimator 161 of the processor 160 and the DOA estimator 161 estimates DOAs from which the respective received signals come in consideration of the weighting coefficients $w_{a1}$ to $w_{aN}$ that are set in the phase shifter 120. An angle to a direction corresponding to 0 degrees and orthogonal to the direction in which the antenna elements 110-1 to 110-N are arrayed is calculated as a DOA. The angles estimated in this manner serve as angles representing the positions of the respective terminals.

The map calculator 162 calculates maps based on the sines of the angles representing the positions of the respective terminals (step S102). Calculated maps about all the terminals are output to the group generator 163. The group generator 163 then executes grouping of the terminals. The grouping is to group terminals in directions in which orthogonal beams can be generated with L subarrays.

Specifically, the group generator 163 sets, as a reference terminal, any one of the terminals for which groups to which the terminals belong to are not determined yet (step S103). From among other terminals for which groups to which the terminals belong to are not determined yet, a terminal corresponding to the map for which the difference between the map and the map of the reference terminal satisfies the condition is grouped in the same group to which the reference terminal belongs (step S104).

The condition that is satisfied by the maps of other terminals which belong to the same group to which the reference terminal belongs is as follows: when the difference between the map of the reference terminal and the map of another terminal in a map space based on sine is approximately equal to a multiple of an interval obtained by equally dividing an area where beams can be generated by the number L of subarrays, the reference terminal and the other terminal belong to the same group. In other words, in a case where a map about a reference terminal is sin α and a map about another terminal is sin β, when sin β, satisfies Equation (2), the reference terminal and the other terminal belong to the same group.

After the reference terminal and other terminals are grouped as described above, it is determined whether all the terminals belong to the same group to which any one of reference terminals belongs and grouping all the terminals completes (step S105). When there are terminals which do not belong to any group according to the result of the determination (NO at step S105), any one of the terminals is set for for a reference terminal (step S103) and grouping between the reference terminal and other terminals is repeated as described above.

When such grouping is executed by the group generator 163 and grouping all the terminals completes (YES at step S105), the subarray assigner 164 executes a subarray assigning process. Specifically, for each combination of usable subarrays among the L subarrays, it is determined whether terminals are present in the directions of orthogonal beams to be generated and directions of orthogonal beams in which terminals are present are counted (step S106). A combination of subarrays that maximizes the number of orthogonal beams in directions in which terminals are present is assigned to the group of the terminals which are present in the directions of the orthogonal beams (step S107).

Figure 6:
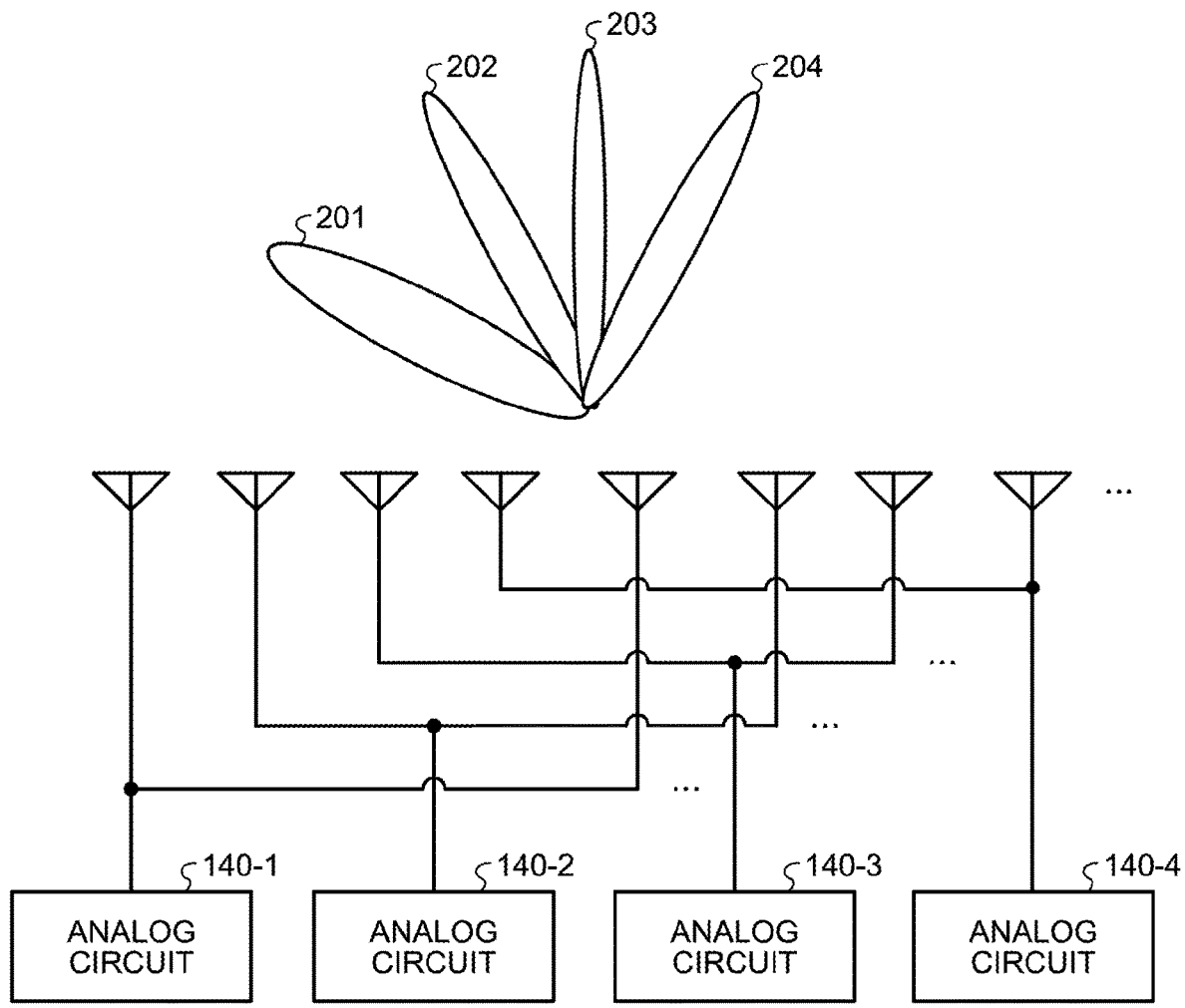
FIG. 6 is a diagram illustrating a relation of phases among beams.

The relationship between the combinations of usable subarrays and the directions of orthogonal beams will be described below by giving specific examples. FIG. 6 is a diagram illustrating a relation of phases among beams that are generated by four subarrays. Specifically, as represented in the upper part of FIG. 6, when four beams 201 to 204 are generated by subarrays #1 to #4 corresponding to the analog circuits 140-1 to 140-4, phases of the respective subarrays and phases of the respective beams are as represented in the table in the lower part in FIG. 6.

As the table in the lower part in FIG. 6 represents, in order to generate the second beam 202 orthogonal to the first beam 201, it suffices if the combination of the subarrays #1 and #3, or the combination between the subarrays #2 and #4 where the difference between the phase differences of the first beam 201 and the second beam 202 is equivalent to n is used. In other words, using the two subarrays where the phase differences are inverted enables the first beam 201 and the second beam 202 to be orthogonal to each other without causing the first beam 201 to interfere with the second beam 202 and without causing the second beam 202 to interfere with the first beam 201.

In the same manner, for example, in order to generate the third beam 203 orthogonal to the first beam 201, it suffices if the combination of the subarrays #1 and #2, the combination of the subarrays #2 and #3, the combination of the subarrays #3 and #4 or the combination of the subarrays #4 and #1 where the difference between the phase differences of the first beam 201 and the third beam 203 is equivalent to π or 3π is used. In other words, using the two subarrays where the phase differences are inverted to each other enables the first beam 201 and the third beam 203 to be orthogonal to each other without causing the first beam 201 to interfere with the third beam 203 and without causing the third beam 203 to interfere with the first beam 201.

When beams are generated by inter-subarray coding, there are combinations of subarrays enabling multiple beams to be orthogonal with each another. The combinations are ones satisfying Condition (A) given above and is defined by the number M of subarrays to be used and the inter-subarray interval K. Note that the number M of subarrays to be used is a divisor of the total number L of subarrays.

Under Condition (A), when the number M of subarrays to be used and the inter-subarray interval K that correspond to usable subarrays are determined, directions of orthogonal beams that can be generated by the combinations of subarrays are determined. The subarray assigner 164 then determines whether there are terminals in the directions of the orthogonal beams and assigns a combination of subarrays to the group of the terminals such that the number of orthogonal beams in directions in which terminals are present is maximized.

When a combination of subarrays is assigned to one group, the same process is repeated on the reset of combinations of subarrays and a combinations of subarrays is assigned to terminals of each of the groups sequentially. When it is difficult to generate orthogonal beams in multiple directions in which terminals are present even when inter-subarray coding is performed using a combination of usable subarrays, the subarray assigner 164 assigns one subarray to one terminal.

Figure 5:
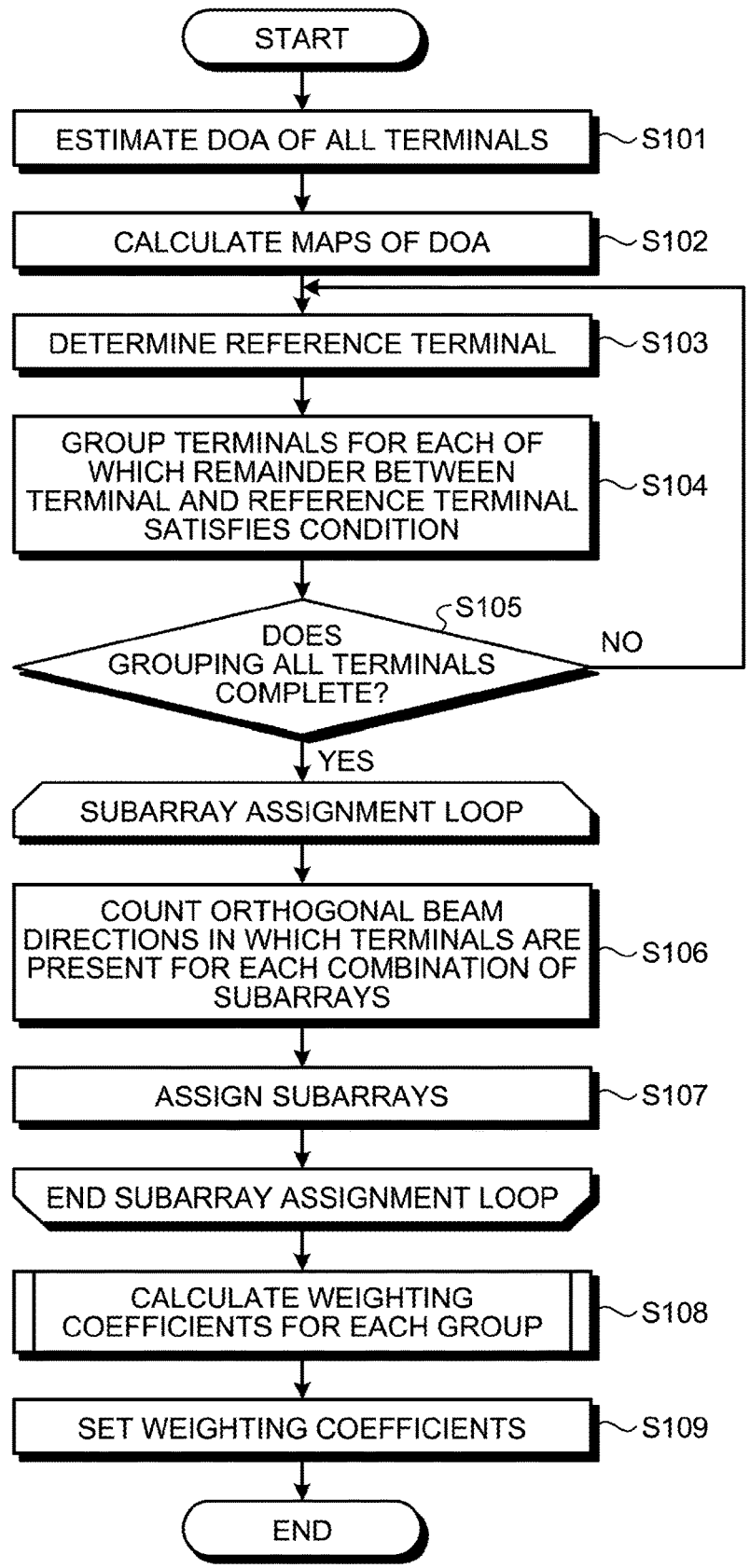
FIG. 5 is a flowchart representing a beam generation process according to the embodiment.

FIG. 5 will be referred back to. When the subarray assignment performed by the subarray assigner 164 completes, the analog weighting coefficient calculator 165 and the digital weighting coefficient calculator 166 calculate weighting coefficients for each group to which subarrays are assigned (step S108). The weighting coefficients $w_{a1}$ to $w_{aN}$ that are calculated by the analog weighting coefficient calculator 165 are output to the phase shifter 120 and are set in the antenna elements 110-a to 110-N. Weighting coefficients that are calculated by the digital weighting coefficient calculator 166 are output to the weighting processor 167 and weighting coefficients for the respective terminals are set (step S109).

Thereafter, signals are transmitted and received simultaneously to and from the terminals of each group to which subarrays are assigned. In other words, to transmit and receive signals to and from the terminals of a group to which a combination of subarrays is assigned, beams that are generated by inter-subarray coding are used and, to transmit or receive a signal to and from a terminal to which a single subarray is assigned, a beam that is generated by the subarray is used. Accordingly, it is possible to transmit and receive signals simultaneously to and from terminals which belong to different groups while performing beam control including inter-subarray coding and to maximize the number of terminals with which communications can be performed simultaneously to increase the throughput.

Figure 7:
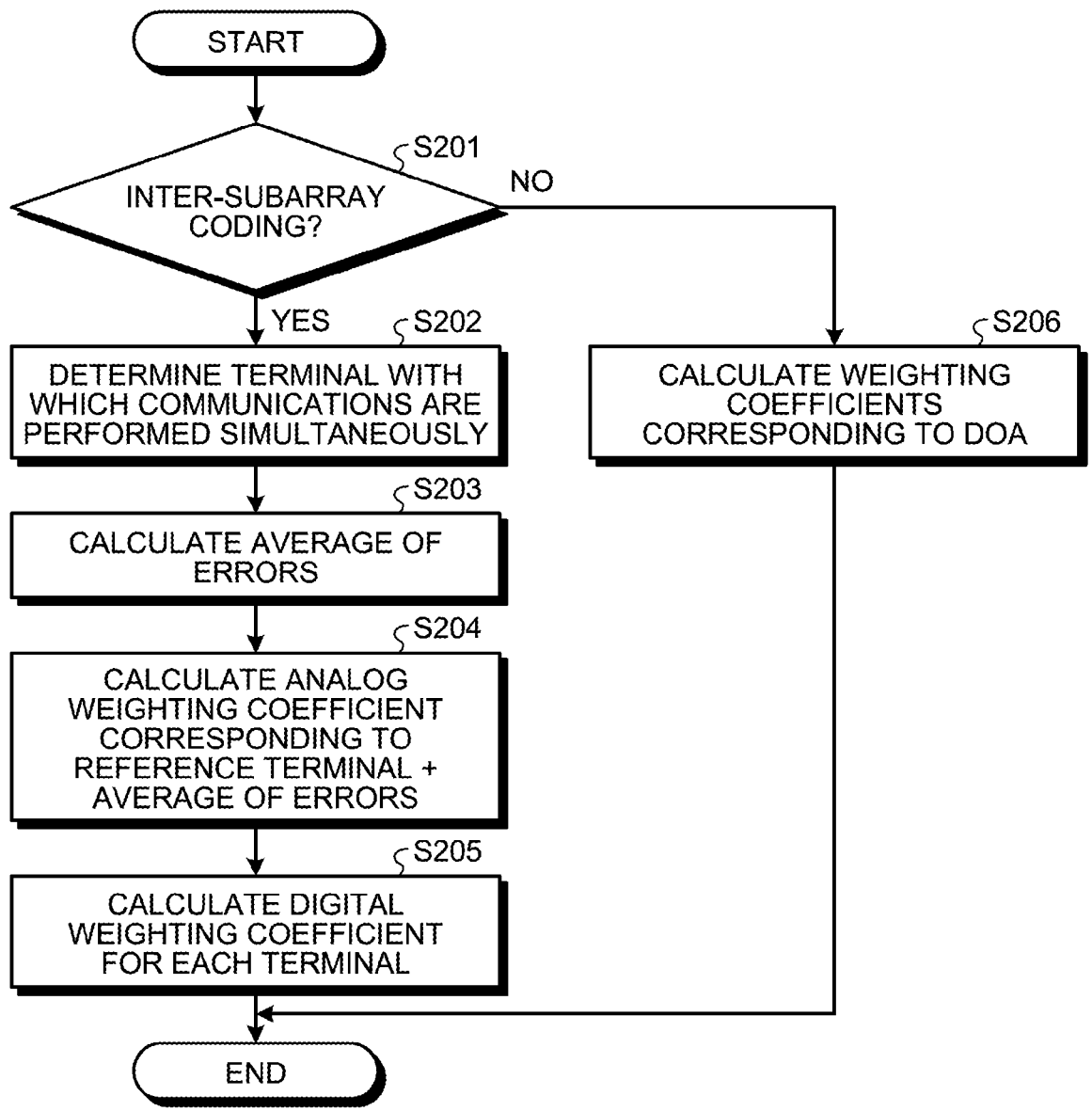
FIG. 7 is a flowchart representing a specific example of a weighting coefficient calculation process.

A specific example of a weighting coefficient calculation process will be described with reference to FIG. 7. FIG. 7 is a flowchart representing a specific example of the weighting coefficient calculation process performed on each group to which subarrays are assigned.

First of all, it is determined whether a group is a group to which multiple subarrays are assigned in order to perform inter-subarray coding (step S201). When the group is a group to which not multiple subarray but a single subarray is assigned (NO at step S201), weighting coefficients corresponding to a DOA relating to one terminal in the group are calculated by the analog weighting coefficient calculator 165 and the digital weighting coefficient calculator 166 (step S206).

On the other hand, the group is a group to which multiple subarrays are assigned (YES at step S201), M terminals which are present in the directions of orthogonal beams that are generated by the M subarrays assigned to the group are determined as terminals with which communications are performed simultaneously (step S202). In other words, terminals with which communications are performed simultaneously are selected one by one from the respective directions of the M orthogonal beams.

Thereafter, as for the maps relating to the determined M terminals, an average of errors based on the map about the reference terminal is calculated (step S203). In other words, the map about each terminal is distant from the map about the reference terminal by the sum of an interval obtained by dividing the map of an area where beams can be generated by the antenna elements 110-1 to 110-N by L and an allowable error. The analog weighting coefficient calculator 165 thus calculates an average of the errors and calculates a weighting coefficient to direct a beam in a direction corresponding to the sum of the map about the reference terminal and the average of the errors (step S204). In other words, for the M terminals, an average y of errors $\Delta x$ according to Equation (2) given above is calculated according to Equation (10) given below.

$$y = \frac{1}{M} \sum_{k=1}^{M} \Delta x_k \quad (10)$$

The analog weighting coefficient calculator 165 calculates a weighting coefficient for an antenna element of a subarray that is assigned to the group.

$$w_n = e^{j2\pi n \frac{d}{\lambda}(\sin\alpha + y)} \quad (11)$$

Note that, in Equation (11) given above, e denotes a base of a natural logarithm, j denotes an imaginary unit, d denotes an interval between antenna elements, $\lambda$ denotes a wavelength of a radio wave, and $\sin \alpha$ denotes a map about a reference terminal. A weighting coefficient that is calculated according to Equation (11) is a weighting coefficient to direct a beam in a direction shifted by the average of the errors from the direction of the reference terminal.

When the analog weighting coefficient is calculated, the digital weighting coefficient calculator 166 calculates a weighting coefficient corresponding to each terminal (step S205). The digital weighting coefficient corresponds to the difference between the map about the reference terminal and the map about each terminal and a coefficient $W_m$ of each terminal can be represented by Equation (12) given below.

$$w_m = e^{j2\pi m \frac{d}{\lambda} \left( \frac{l_k}{L} \cdot 2 \sin \frac{\Theta}{2} \right)} \quad (12)$$

In Equation (12), $w_m$ denotes a weighting coefficient of a subarray corresponding to the DA/AD converter 150-m and $l_k$ denotes a value corresponding to the difference between a map about a terminal k and a map about the reference terminal. In other words, in a map space based on sine, the map about the terminal k is distant from the map about the reference terminal by a product obtained by multiplying, by $l_k$, the interval obtained by equally dividing the map of the area where beams can be generated by L.

As described above, for terminals of a group on which inter-subarray coding is to be performed, a weighting coefficient to generate a beam directed in a direction shifted from the direction of the reference terminal by an average of errors in the group can be calculated as an analog weighting coefficient and a weighting coefficient corresponding to a difference between each terminal and the reference terminal can be calculated as a digital weighting coefficient.

The weighting coefficient calculations described above enable simultaneous communications with terminals of a group on which inter-subarray coding is to be performed and terminals to each of which one subarray is assigned and thus maximizes the number of terminals with which communications are performed simultaneously.

Specifically, FIG. 8 represents the numbers of terminals with which communications can be performed simultaneously, for example, in a case where the total number of subarrays is 4. As the total number of subarrays is four herein, the maximum number of terminals with which communications can be performed is also 4.

In Pattern 1, as four terminals all belong to First Group, inter-subarray coding using all the subarrays simultaneously generates beams to the four terminals of First Group. This enables simultaneous communication with the four terminals.

In Pattern 2, as three terminals belong to First Group and the remaining one terminal does not belong to First Group, inter-subarray coding using all the subarrays simultaneously generates beams to the three terminals which belong to First Group. This enables simultaneous communication with the three terminals.

In Pattern 3, as two terminals belong to First Group and the remaining two terminals do not belong to First Group, two subarrays are assigned to First Group to perform inter-subarray coding and a subarray is assigned to each of the remaining two terminals. Accordingly, it is possible to simultaneously generate beams to the two terminals which belong to First Group and the two terminals which do not belong to the group. This enables simultaneous communication with the four terminals.

As for Pattern 3, inter-subarray coding using all the four subarrays enables only communication with the two terminals which belong to First Group and, when one subarray is assigned to each of terminals of different groups, enables only communication with the three terminals of different groups. On the other hand, execution of the subarray assignment of the embodiment enables simultaneous communication with the four terminals as described above.

Figure 9A:
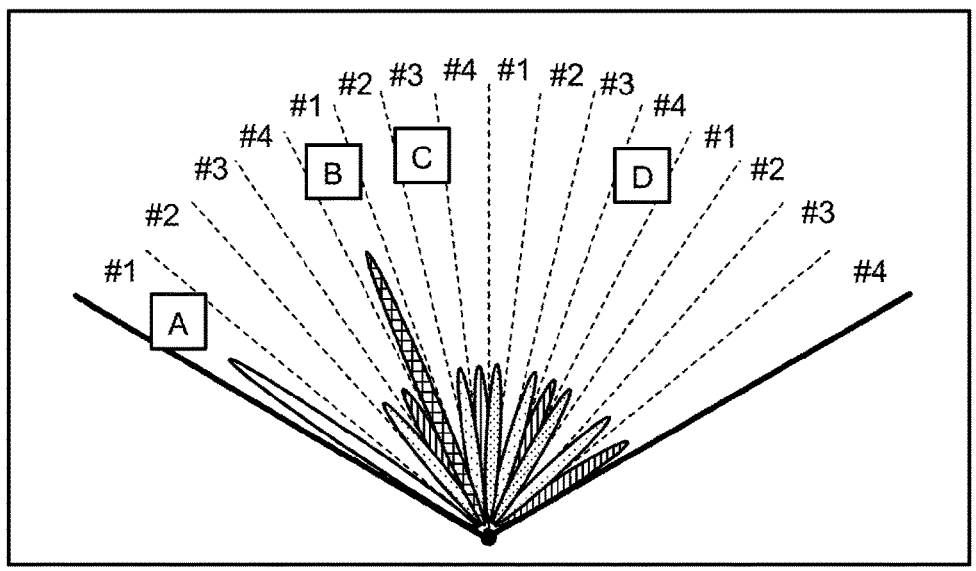
FIGS. 9A to 9C are diagrams illustrating a specific example of generated beams.

In other words, as illustrated in FIG. 9A, beams based on inter-subarray coding are generated to Terminals A and B which belong to First Group #1 and one subarray is used to generate each of beams to Terminal C which belong to Group #3 and Terminal D which belong to Group #4. As beams are generated to Terminals A and B by inter-subarray coding, a gain obtained by generating beams using multiple subarrays can be obtained and beams with intensity higher than that of beams to Terminals C and D can be directed to Terminals A and B.

As for Pattern 4, as two terminals belong to First Group and the remaining two terminals belong to Second Group, two subarrays are assigned to First Group to perform inter-subarray coding and, if possible, two subarrays are assigned to Second Group to perform inter-subarray coding. This enables simultaneous generation of beams to the two terminals which belong to First Group and at least one of the terminals which belong to Second Group. This enables simultaneous communication with at least three terminals.

As for Pattern 4, inter-subarray coding using all the four subarrays only enables simultaneous communication with the two terminals which belong to First Group and, when one subarray is assigned to each of terminals of the different group, only enables simultaneous communication with the two terminals which belong to the different group. On the other hand, execution of the subarray assignment according to the embodiment enables simultaneous communication with at least three terminals as described above.

Figure 9B:
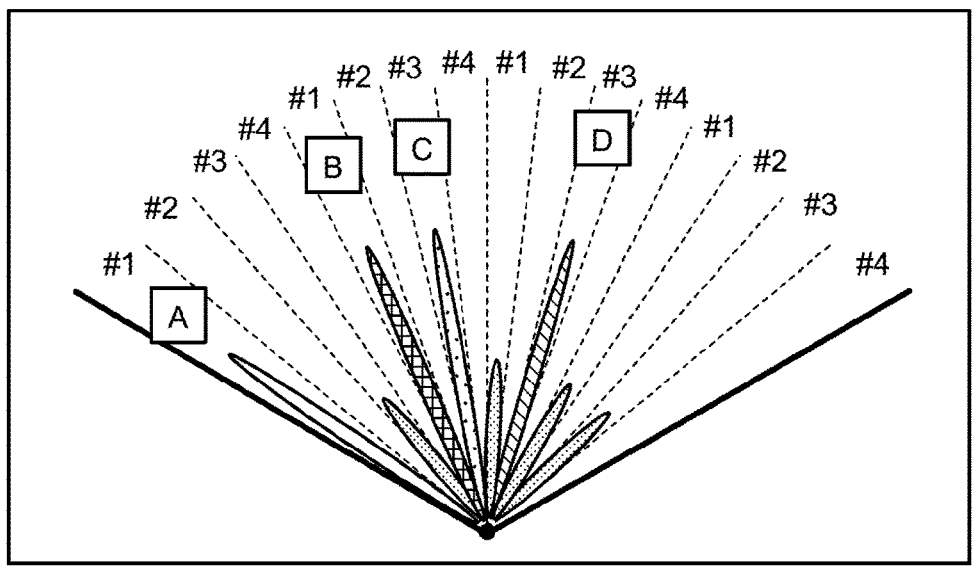

In other words, as represented in FIG. 9B, when Terminal A and B which belong to First Group #1 are positioned in directions of beams adjacent to each other and Terminal C and D which belong to Second Group #3 are positioned in directions of beams adjacent to each other, it is possible to assign subarrays with one subarray in between to each of the groups. Accordingly, it is possible to execute inter-subarray coding using the two subarrays on each of the two groups and thus to communicate with the four terminals simultaneously.

Figure 9C:
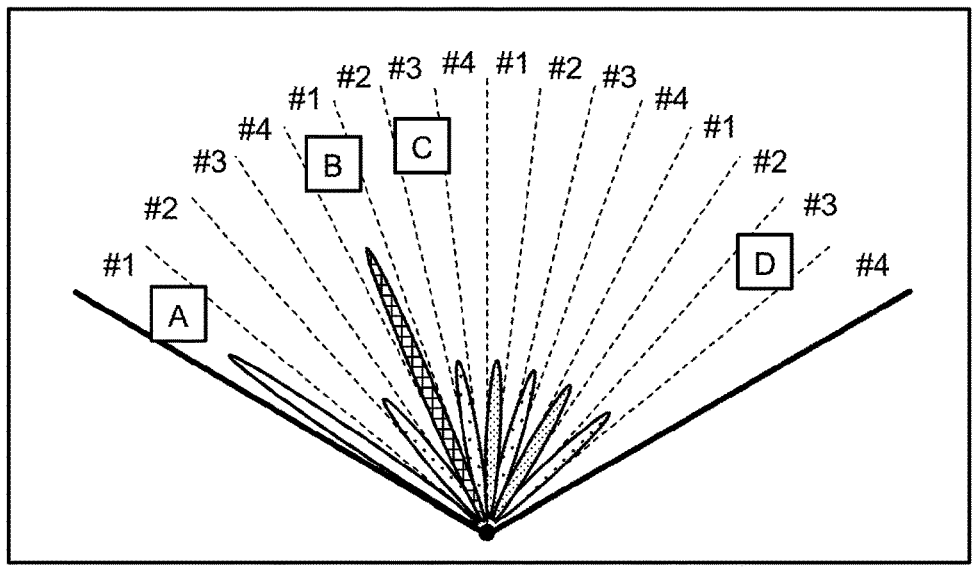

On the other hand, as represented in FIG. 9C, when Terminals A and B which belong to First Group #1 are positioned in directions of beams adjacent to each other and Terminals C and D which belong to Second Group #3 are positioned in directions of beams with a beam in between, it is not possible to assign subarrays for inter-subarray coding to both of the groups simultaneously. For this reason, inter-subarray coding using two subarrays is executed for any one of the two groups and one subarray tis assigned to one of the terminals of the other group. Accordingly, simultaneous communications with the three terminals are enabled.

As for Pattern 5, as four terminals all do not belong to the same group, different subarrays are used for the respective terminals to generate beams to the respective terminals simultaneously. This enables simultaneous communications with the four terminals.

As described above, according to the embodiment, multiple terminals are grouped according to the positions of the terminals, multiple subarrays are assigned to terminals of part of the groups to perform inter-subarray coding, and a single subarray is assigned to each of the terminals of other groups to generate a beam. This makes it possible to simultaneously transmit and receive signals to and from terminals which belong to different groups while performing beam control including inter-subarray coding and maximize the number of terminals with which communications can be performed simultaneously and thus increase the throughput.

According to a mode of the wireless communication device and the beam control method disclosed herein, an effect that the throughput can be increased is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication device comprising:
   a plurality of subarrays each including a plurality of antenna elements and an analog circuit configured to perform a given analog process on signals to be transmitted from the antenna elements or signals that are received by the antenna elements; and
   a processor that is connected to the subarrays,
   wherein the processor is configured to execute a process including:
   estimating direction of arrivals from which signals transmitted from a plurality of terminals come;
   calculating maps based on trigonometric functions of angles representing the estimated direction of arrivals;
   generating a plurality of groups to which the terminals belong based on the calculated maps;
   assigning, to each of the groups, a combination of subarrays to generate directional beams that do not interfere with each other, the combination of subarrays being included in the subarrays; and
   determining weighting coefficients to generate directional beams in directions of the terminals which belongs to each group by using the combination of subarrays assigned to each of the groups, and the combination of subarrays and other subarrays communicate with the terminals simultaneously using the directional beams.

2. The wireless communication device according to claim 1, wherein the assigning includes determining the combination of subarrays to be assigned to each of the groups using beam numbers that are given to directional beams corresponding to the direction of arrivals and subarray numbers that are given to the subarrays.

3. The wireless communication device according to claim 2, wherein the assigning includes determining the combination of subarrays to be assigned to each of the groups such that k and I denoting beam numbers corresponding to direction of arrivals from which signals of terminals which belong to the same group come, L denoting the number of the subarrays, M denoting the number of subarrays contained in the combination of subarrays, and K denoting a difference between subarray numbers of subarrays contained in the combination of subarrays satisfy the following condition:

$$\text{Condition}\begin{cases} \frac{KM(k-1)}{L} \text{ is an integer, and } \mod\left(\frac{KM(k-1)}{L}, M\right) \neq 0, \\ \text{wherein mod } (m, n) \text{ denotes a remainder} \\ \text{obtained by dividing } n \text{ by } m. \end{cases}$$

4. The wireless communication device according to claim 1, wherein the assigning includes, when the combination of subarrays to generate directional beams that do not interfere with each other includes a subarray that is already assigned to any group, assigning a subarray that is not assigned yet to a remaining group one by one.

5. The wireless communication device according to claim 1, wherein the determining includes
calculating first weighting coefficients to weight the antenna elements of each of the subarrays, and
calculating second weighting coefficients to weight signals to be transmitted respectively to the terminals of each of the groups or signals that are received respectively from the terminals of each of the groups.

6. The wireless communication device according to claim 1, wherein the generating includes grouping, into the same group, terminals that are distant from each other by an integral multiple of an interval obtained by equally dividing an area where directional beams are possible to be formed by all the subarrays by the number of the subarrays in a map space based on the trigonometric functions that are used for the calculating.

7. A beam control method executed by a wireless communication device including a plurality of subarrays each including a plurality of antenna elements and an analog circuit configured to perform a given analog process on signals to be transmitted from the antenna elements or signals that are received by the antenna elements, the beam control method comprising:
estimating direction of arrivals from which signals transmitted from a plurality of terminals come, using a processor;
calculating maps based on trigonometric functions of angles representing the estimated direction of arrivals, using the processor;
generating a plurality of groups to which the terminals belong based on the calculated maps, using the processor;
assigning, to each of the groups, a combination of subarrays to generate directional beams that do not interfere with each other, using the processor, the combination of subarrays being included in the subarrays;
determining weighting coefficients to generate directional beams in directions of the terminals which belongs to each group by using the combination of subarrays assigned to each of the groups, using the processor; and
communicating, by the combination of subarrays and other subarrays, with the terminals simultaneously using the directional beams.

* * * * *